Nov. 9, 1971  G. M. PRUONTO  3,618,245
DEVICE FOR BALANCING GUNS

Filed March 3, 1969  2 Sheets-Sheet 1

INVENTOR
GENE M. PRUONTO

BY *Albert M. Zalkind*

ATTORNEY

Nov. 9, 1971   G. M. PRUONTO   3,618,245
DEVICE FOR BALANCING GUNS
Filed March 3, 1969   2 Sheets-Sheet 2
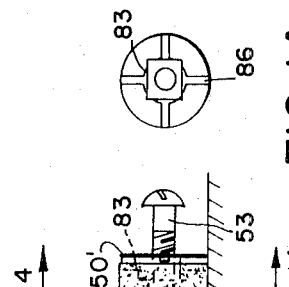
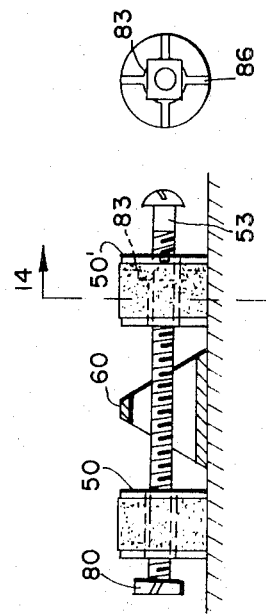
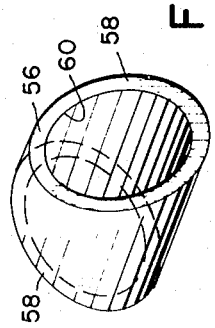
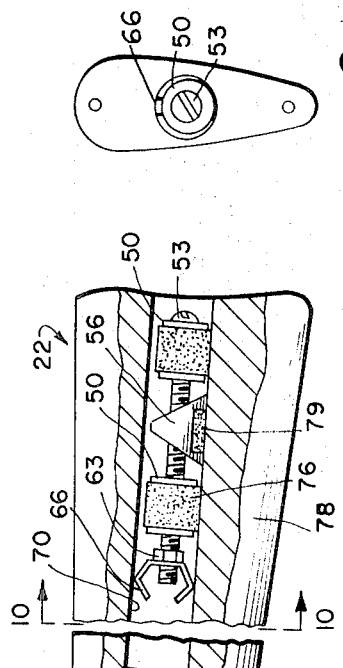
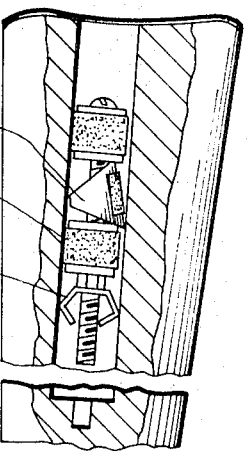
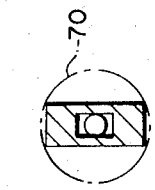
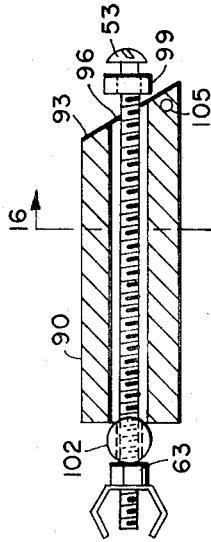
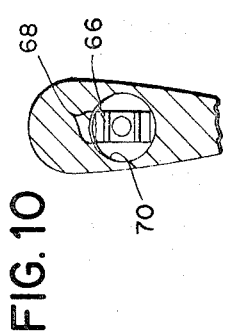
INVENTOR
GENE M. PRUONTO
BY *Albert M. Zalkind*
ATTORNEY

| United States Patent Office | 3,618,245 |
|---|---|
| | Patented Nov. 9, 1971 |

3,618,245
DEVICE FOR BALANCING GUNS
Gene M. Pruonto, 124 E. 1st Ave., Altoona, Pa. 16602
Filed Mar. 3, 1969, Ser. No. 803,566
Int. Cl. F41c *21/00, 23/00*
U.S. Cl. 42—1 R                7 Claims

ABSTRACT OF THE DISCLOSURE

The invention relates to the problem of balancing guns, particularly shotguns so that a person owning several guns can give them all the same weight and balance them to give the same feel for all guns. The structure of the invention is such that a balancing weight can be applied to any gauge of shotgun whether it be single barrel, double barrel, or the so-called over-under type. The weight devices of the invention cen be adjustably secured anywhere along the length of the gun barrel, or barrels and/or in the bore of the gun stock in order to provide a balance point for any gun which will be the same balance point for all other shotguns in a shooter's collection. The invention is particularly important for trap and skeet shooting where it has been found that switching from one gun to another, where the guns have different balance points, affects the aim and skill of the shooter in a deleterious manner.

---

Briefly, the invention contemplates the provision of front and rear gun balancing weights wherein the front weight is made of two separate but identical members which can be fastened to the sides of a gun barrel for single barrel guns or to the respective sides of the barrels of double barrel guns. The arrangement which permits securement to a single barrel gun likewise permits securement to an over-under gun by fastening to the lower barrel.

The weight members are so constructed that the main mass is below the gun barrels and has a bolt passing therethrough transversely below the barrel or barrels, thus clamping the members to the gun. The facing surfaces of the members are suitably notched to securely grip the cylindrical sides of barrels. The members are so shaped that they provide a wide spacing therebetween at the top surface of barrels so as not to impede aiming vision.

The weight comprised of two members which are substantially identical can be made in various values such as two ounces, six ounces, eight ounces, etc., using one or more bolts depending on length of the members. Also a single standard weight of say four ounces provided with aligned pins and sockets can be used in plurality by aligning them on gun barrels by means of the pin and socket arrangements so that a desired total weight can be achieved.

The actual weight taken in conjunction with the position at which the weight is affixed to the gun along the barrel or barrels, and taken further in conjunction with a rear weight in the bore of the gun stock, can effect a balance point along the length of the gun generally forward along the hand grip which is the same balance point for any gun or a set of guns. Inasmuch as guns come in various sizes and weights and having different balance points, it will be apparent that providing a balance point which is the same for all guns in a shooter's collection will provide him with the same "feel" in using any one of the guns. Further, he can adjust that balance point along the hand grip to any point which is comfortable to him considering his stature and strength.

The invention is also usable to bring about a desired condition of making all guns in a shooter's collection of equal weight, as well as providing an identical balance point along the hand grip. While it is contemplated that both a front and rear weight will be used, either may be used under some circumstances.

The rear weight is a unit slidable into the stock bore and having a locking element in the form of a truncated member to effect cam surfaces. Upon being engaged by abutment means actuated by a threaded bolt the locking element is forced into a gripping engagement with the surface of the stock bore.

A detailed description of the invention now follows in conjunction with the appended drawing in which:

FIG. 8 is a side view partially in section of a gun stock showing the rear balancing weight unit in the stock bore, and not yet locked in position;

FIG. 9 is an end view of the stock with the butt plate removed;

FIG. 10 is a view of the inner end of the weight taken on the fragmented section line 10—10;

FIG. 11 is a perspective of the locking means for the weight, being a truncated tube element having sloping cam sides;

FIG. 12 is similar to FIG. 8, but illustrates the weight in lock condition in the stock bore.

FIG. 13 is a side view of a modified rear weight;

FIG. 14 is an end view, taken from the right hand side but eliminating the bolt shown in FIG. 13;

FIG. 15 shows a further modification;

FIG. 16 is a section on the line 16—16 of FIG. 15.

Figure 1:
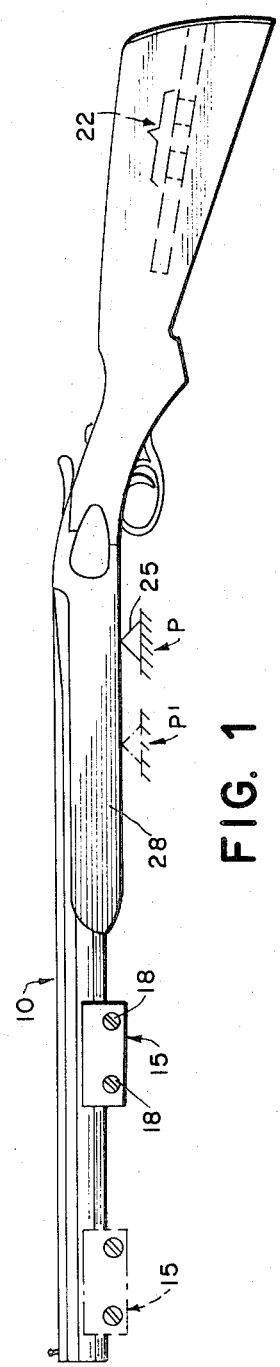
FIG. 1 is a lengthwise view of an over-under shotgun showing the weight of the invention applied thereto to change the balance point, by being positioned at two different locations.

Referring to the drawing, FIG. 1, an over-under shotgun is illustrated in full length wherein the barrel 10 has a front weight 15 (shown in solid lines) secured thereto by bolts 18. Assuming that the stock of the gun is weighted with a rear weight 22 up to a certain weight value which would normally be the case in guns owned by shooters, the position of the weight 15 would give a balancing point P as indicated by the fulcrum bar 25 engaging the hand grip 28. As a matter of fact, a gun owner can use any suitable type of fulcrum bar, for example, the edge of a vertical board or plate, perhaps a quarter to a half-inch thick could be used as a fulcrum to establish the balancing point P. If desired he could mark that balancing point on the hand grip and proceed to apply a suitable value of weight to all of his other guns at specific positions along the barrel and in the stock in order to establish equal weight and a balancing point at substantially the same location for each gun. This could be with reference to the distance to the trigger or butt or with reference to where he would normally grip the gun, a matter of personal preference and comfort of "feel."

On the other hand, assuming that the gun owner desired the balancing point to be at the location indicated by the phantom line fulcrum p' he would merely shift the weight 15 to the phantom line position closer to the end of the barrel. As a matter of simple leverage principles this would, of course, move the balancing point forward to p'.

While shotguns are occasionally butt loaded to suit each individual, it will, of course, be appreciated that butt loading is not absolutely essential to the operability of the invention except for absolute balancing. However, it has been found as a matter of practice that butt loading in the gun stock is desirable and the invention hereon contemplates a structure for that purpose as will be later described. Even so, the adjustable front weight of the invention can effect the balance point which is the same for a set of guns even though the butt loading is different in all such guns. Further, when a gun owner uses the invention for a set of guns he may, if he wishes, vary the butt loading in any or all such guns and still establish the same balancing point for the set. This may be desirable where the gun owner prefers the balancing weight to be nearer the end of the barrel or the muzzle to reduce vibration.

Figure 2:
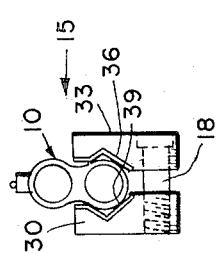
FIG. 2 is a muzzle view of FIG. 1 to an enlarged scale.

The front balancing weight consists of two members 30 and 33 (FIG. 2) having notches 36 preferably lined with any thin plastic or other protective soft pliable material 39 so as to grip the sides of the lower barrel securely. The members are held together by the transverse bolts 18 which pass through the member 33 and threads into the member 30. It will be noted that the members 30 and 33 are identical except for the provision of the throughbores in member 33 and the threaded bores in member 30, to take the bolts. Although a conventional bolt is shown, any type of suitably strong fastening such as an Allen set screw could be used.

Figure 6:
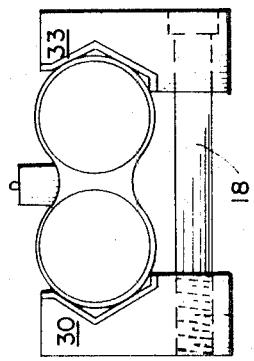
FIG. 6 is a side view of a weight unit of which a plurality can be aligned to achieve a multiple weight value and, FIG. 7 is a muzzle view similar to FIG. 2 but showing the modification of FIG. 6 applied to an over-under 410 gauge shotgun.

The weight 15 as shown in FIG. 1, actually has a multiple value in that it will be seen to be of such length that preferably two bolts are used for securement. A single value weight would utilize a single bolt as illustrated in FIG. 6 to be subsequently discussed.

Figure 3:
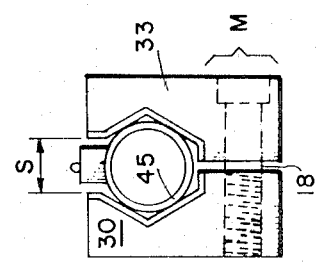
FIG. 3 illustrates a muzzle view of the invention applied to a 410 gauge single barrel shotgun.

Referring to FIG. 3, it will be noted that the main mass of each weight member 30 and 33 is disposed below the barrel 45 of a shotgun and this is advantageous in promoting stability. Thus, no top heaviness of the barrel is introduced, and the mass counteracts vibration. The bolt 18 passes through the main masses for rigidity. Further, a very important feature of the invention resides in the wide spacing S as shown in FIG. 3 at the top of the barrel so that there is no impediment to aiming vision. Thus, by shaping the weight members as generally rectangular but narrower at the top than at the bottom, the dual advantage of low hung mass and clear aiming vision is achieved.

Figure 4:
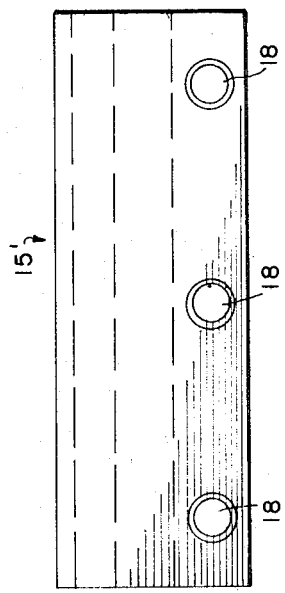
FIG. 4 is a side view illustrating a weight having a multiple unit value.

Referring to FIG. 4, a triple unit value weight 15' is shown wherein three bolts 18 are spaced along the weight members to securely and evenly hold the weight to barrels.

By comparing FIGS. 1–4, it will be noted that the end profiles of the weight members are all the same and that single, double, triple or other multiple weight values can be used. Thus, FIG. 3 can represent an end view of a single value unit having but one bolt, as illustrated in side view of the modification of FIG. 6.

Figure 5:
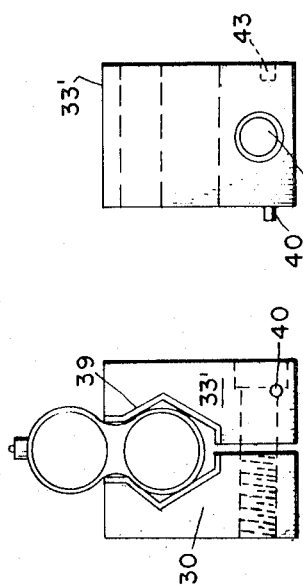
FIG. 5 is a muzzle view of the invention applied to a 12-gauge double barrel shotgun.

Referring to FIG. 5, the invention is shown as applied to a double barrel shotgun. It will be noted that the only change required is the use of a longer bolt 18'. Here again the members 30 and 33 represent an end view of a single or multiple weight unit device.

Referring to FIG. 6, a single unit weight member 33' is disclosed having an extending pin 40 at one end face and a socket 43 aligned with the pin at the opposite end face and having a diameter such that it can smoothly and slidably accommodate any pin 40 on an identical weight member. Thus, by providing a pin extending from one end surface and an aligned socket at the opposite surface, it will be apparent that any number of weight units can be aligned and secured to guns, each having its own bolt 18.

Figure 7:
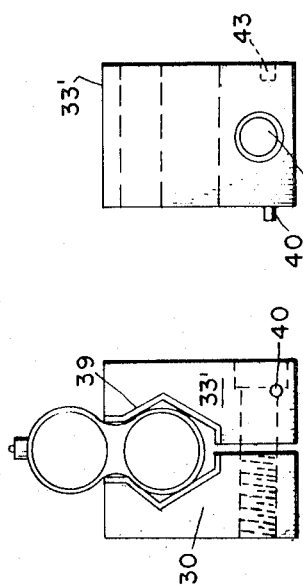

FIG. 7 is a front view of FIG. 6 showing the device secured for an over-under shotgun and the view of FIG. 7 can represent an end view of a single unit or plurality of aligned units.

The versatility of the invention is demonstrated by the fact that FIGS. 3, 5 and 7 are, respectively, actually drawn to scale for a 410 gauge single barrel gun, a 12 gauge double barrel gun, and a 410 over-under barrel gun, wherein the identical weight members 30 and 33 are utilized. Of course, a multiple unit can be used, or a plurality of pin aligned units of the type shown in FIGS. 6 and 7.

It is contemplated that additive weights will be in approximate increases of two ounces. Thus, a single weight unit of two members 30 and 33 would weigh four ounces and integral units of increasing value would be six ounces, eight ounces, etc., due regard being had for bolt weight. However, a shooter could provide himself with a quantity of weight units as seen in FIGS. 6 and 7 using as many as required for his purposes, these being each two ounces.

Referring now to FIGS. 8 through 12, a balance weight is shown comprising weight means such as slugs or bushings of lead 50 slidably carried on a manually rotatable bolt 53 and intermediate the weight members is a truncated tubular lock cam member 56, shown in perspective in FIG. 11, having slanted opposed cam surfaces 58.

The weight members are bored to be smoothly slidable on the bolt while the cam member 56 has a very large opening 60 so that it can readily go askew of the bolt as shown in FIG. 12. The bolt passes through the weight members and the cam member and has a nut 63 at its inner end to which is fastened as by soldering a flexible metal strap 66 bent as shown to form wings which flexibly engage the interior of the bore 70 of a gun stock 73, shown with the butt plate removed in FIG. 8. The element 66 is a holding means which although engaging diametrically opposed surfaces of the bore permits the balancing weight as a unitary assembly carried on the bolt 53 to be slid longitudinally into the bore. However, by having corners 68 (FIG. 10) digging into the bore surface, element 66 prevents rotation of the nut 63, which is of course inaccessible from the open end of the bore, so that the bolt 53 can be rotated by a screw driver to bring the weight members 50 into a clamping action against the cam member 56. The steeply sloping sides of the cam member being thus abutted, the cam member is forced to move radially, or generally radially, to take a position, for example, as shown in FIG. 12 where it locks the balancing weight unit within the bore.

The illustrations in FIGS. 8 and 12 are merely a general case. For example, when the weight unit is slid into the bore the cam member might be oriented about the bore axis to some position other than the position shown in FIG. 8. Thus the widest side need not be resting on the bottom of the bore. Also, when the unit is slid into the bore, the bolt is usually taken up sufficiently so that there is little or no space between the weight members and the cam member. Finally, the cam member can cock to either side since it is sloped on both sides, or it can move directly radially. In any event, there is generally radial motion forcing the cam against the bore surface when it is squeezed between the weight members and a very tight gripping engagement for securing the balance weight unit at any desired location is effected. Whether or not the cam member moves directly radially or only generally radially as in FIG. 12 so that an edge portion of one cam face abuts the bore surface is of no importance insofar as effecting any significant change in balance is concerned.

Preferably the weight members are provided with a frictional surface such as a ring of sandpaper 76 cemented thereto and the cam member may likewise be given a cemented patch 79 of sandpaper. Other ways of providing a frictional surface are, of course, obvious but in any event such a surface is desired so that in going through the procedure of balancing the gun, the balancing weight can be slid to any position in the bore and will hold the that position temporarily even though the bore may be somewhat slanted. This facilitates adjustment of the rear balance weight in the stock, which can be pushed in or shaken outwardly. A string can also be looped to the bolt head before the weight is slid into the bore of the stock so that its position can be easily adjusted to a precise place by pushing with a pencil or screw driver or pulling of the string.

Once the weights have been placed in position, they are secured in a manner obvious from the above description. Either weight can be removed or shifted at any time as will be likewise apparent.

Referring to FIGS. 13 and 14, a modified balancing weight is illustrated wherein all identical parts have the same numerals as in FIG. 7. An abutment 80, such as a split washer or the like, is permanently fixed to the end of a bolt and a nut 83 is sunk into the weight 50' at its outer face being thus keyed thereto. The outer face of the weight member 50' is slotted as by slots 86. Accordingly, the weight member 50', which carries the nut, can be kept stationary, that is, held against rotation by a screw driver in any slot 86, and another screw driver used to turn the bolt thereby bringing the abutment effect of the weight members against the cam member to cause it to move into a binding condition within the bore of a gun stock.

It will be understood that the structures disclosed can be varied. For example, the rear weight members can be of different value and only one member need be used, a washer being substituted for the abutment means otherwise provided by the eliminated weight member. Also, the cam member can be given appreciable weight, in fact, all of the weight, and it can be a flat sided member with but a single cam face and having a parallel sided slot through which the bolt passes. Such a construction is shown in FIG. 15 wherein a single element 90 is of rectangular section and has a cam slope 93 and a widened slot 96 through which the bolt passes. A non-tilting washer 99 is carried slidably on the bolt and the other end of the element 90 bears against a ball 102 slidably carried on the bolt and which bears against the nut. A hole 105 is provided through which a string may be looped to aid in position adjusting.

The general procedure for matching a set of shotguns, or the like, is to first select the heaviest gun of the set and place it on the fulcrum to note its balance point. If desired, the balance point can be changed at this time by shifting either the front or the rear balancing weight, or both, but not to the same degree if they are equal weights as will be obvious from consideration of the basic principle of physics. In this regard it can be stated that the closer both of the weights are toward the balancing point, the less the angular moment of inertia about the balancing point will be and the further the weights are from the balancing point, the greater will be the angular moment of inertia. Possibly the latter condition may be preferable from a standpoint of resisting angular kick upward at the instant of firing, but in any event a change in the angular moment of inertia can affect a certain "feel" of the gun to the owner and it is a matter of personal taste where he chooses to place the weights from a standpoint of raising or lowering the angular moment of inertia about the balancing point. Thus, the balancing point may be different for different shooters; what would be comfortable and best suited for one might not be suited to another, although generally all such balancing points are somewhere along the hand rest forward of the trigger. The user can establish a balancing point on the hand rest for his standard gun as a preliminary step by adjusting the front and rear weights.

Having adopted a standard based on the heaviest gun in his collection, the owner than proceeds to place a suitable degree of weight, front and rear, on all other guns in his collection to bring them up to the same weight as the standard. A selection of weights of known mass is desirable in the practice of the invention.

Subsequent to establishing uniform weights for all guns in the collection, the owner then places each gun in turn on the fulcrum at the desired balancing point as noted for his standard gun. Each gun in turn is then balanced by shifting of the front and rear weights so that it will rest at the desired point on the fulcrum. The front weight can be slightly tightened and the gun then lifted from the fulcrum and held approximately level so that the frictional effect which holds the rear weight in the bore of the stock will not be lost and the gun lifted to the shoulder of the user to check if he has the exact balancing point which he desires. If not, then a slight adjustment of the weights or either weight, can balance the gun at just the point desired. Thereafter the front and rear weights are locked in place in the manner hereinabove described. Each gun in a collection can be thus balanced.

Utilization of the invention can bring about the ideal condition where a shooter can effect a set of guns all of the same absolute weight regardless of gauge, and all having the same balance point. This condition is highly desirable because different gauge guns can vary in weight by two or more pounds and in switching from one gun to another the shooter loses "feel" which throws his aim off.

While vibration of barrels in shotgun shooting is not particularly important, nevertheless the less vibration that a gun has the more smoothly it can be handled and hence while the invention is primarily for the purpose of establishing weight and balancing equality, its tendency to reduce vibration does have an advantage.

It will be apparent, due to the simplicity of the device that any person owning guns and being familiar with guns can without having any special skills make all of his guns the same weight and having the same balance point. Further, by positioning a rear weight within the stock in conjuncton with a suitably selected adjustable front weight he can locate the adjustable weight on the barrel within a wide range although it is believed that a forward position toward the muzzle is preferable. Not only would such forward position dampen barrel vibration, but it would increase the angular motion of inertia about the balance point and this would tend to counteract the upward kick at the instant of firing as well as aid the shooter in holding a steadier aim.

I claim:

1. A balancing weight for a gun stock comprising weight means and having a cam member and being slidably insertable in the bore of a gun stock; and means for effecting axial pressure on said cam member to move said cam member generally transversely of said bore into gripping engagement with the inside thereof at a predetermined position for locking said balacing weight therein.

2. A balancing weight as set forth in claim 1, and further comprising a manually operable element passing through said cam member so as to be longtudinally disposed in said bore; and abutment means on said element engageable with said cam member upon manual operation of said element to force the movement of said cam member into gripping engagement.

3. A balancing weight as set forth in claim 1, and further comprising a bolt passing through said weight means and said cam member and having a nut member and holding means for holding said nut member non-rotative when said bolt is rotated; abutment means on said bolt axially movable against said cam member when said bolt is rotated to force the movement of said cam member into gripping engagement.

4. A balancing weight as set forth in claim 3, wherein said weight means comprises at least one collar of predetermined weight and having an end surface effecting said abutment means; and said holding means comprises a flexible member carried by said nut and having an axially movable but non-rotative gripping engagement with said bore sufficient to hold said nut against rotation when said bolt is being rotated.

5. A balancing weight as set forth in claim 1, said balancing weight having a friction means for engagement with the surface of said bore for temporarily holding said balancing weight in position prior to locking therein.

6. A gun balancing weight comprising a pair of separable weight members having fastening means therebetween and spaceable to grip the sides of barrels of single and double barrel guns for clamping securement at a point therealong for effecting a desired balance; said weight members having opposed notches to grip the sides of a single barrel gun therebetween, or respective sides of a double barrel gun therebetween, and said members being substantially spaced at their upper portions to leave clear aiming sight; each of said members having a pin protruding at one end face and an aligned socket at the opposite face whereby a plurality of pairs of members may be aligned and secured to a gun.

7. A gun balancing weight comprising a pair of separable weight members having fastening means therebetween and spaceable to grip the sides of barrels of single and double barrel guns for clamping securement at a point therealong for effecting a desired balance; said weight members having opposed notches to grip the sides of a single barrel gun therebetween, or respective sides of a double barrel gun therebetween, and said members being substantially spaced at their upper portions to leave clear aiming sight; said fastening means comprising a bolt, the respective main mass of said weight members being disposed adjacent the ends of said bolt and said bolt being disposed to extend transversely below gun barrels; one of said members having a pin protruding at one end face in the axial direction of the notch therein and having an aligned socket at the opposite face whereby a plurality of pairs of members may be aligned and secured to a gun.

References Cited

UNITED STATES PATENTS

| 404,921 | 6/1889 | Miller | 42—71 |
| 789,403 | 5/1905 | Aitken | 42—71 |
| 1,560,840 | 11/1925 | Molloy | 42—1 UX |
| 2,921,396 | 1/1960 | Larson | 42—1 |

OTHER REFERENCES

Greener, William W., The Gun, Cassell and Co., 1910, pp. 417, 423, 424.

BENJAMIN A. BORCHELT, Primary Examiner

S. C. BENTLEY, Assistant Examiner

U.S. Cl. X.R.

42—71